United States Patent [19]

Conrad et al.

[11] 4,329,583

[45] May 11, 1982

[54] HIGH POWER LASER IRRADIANCE DISPLAY MATERIAL

[75] Inventors: Raymond W. Conrad, Russellville; Aryeh Kidron, Huntsville, both of Ala.

[73] Assignee: The United States of America as represented by the Secretary of the Army, Washington, D.C.

[21] Appl. No.: 162,333

[22] Filed: Jun. 23, 1980

[51] Int. Cl.³ .............................................. H01J 31/49
[52] U.S. Cl. .................................... 250/330; 250/458
[58] Field of Search ............... 250/330, 342, 352, 458

[56] References Cited

U.S. PATENT DOCUMENTS 4,253,022  2/1981  Allen et al. .................... 250/352 X
4,262,200  4/1981  Guy .................................... 250/352

Primary Examiner—Davis L. Willis
Attorney, Agent, or Firm—Nathan Edelberg; Robert P. Gibson; Harold W. Hilton

[57] ABSTRACT

A device for the passive location of irradiance display of high power infrared beams at remote locations utilizing the combination of reflecting material with high thermal conductivity and an absorbing refractory material with high emissivity in the visible portion of the electromagnetic spectrum.

6 Claims, 1 Drawing Figure

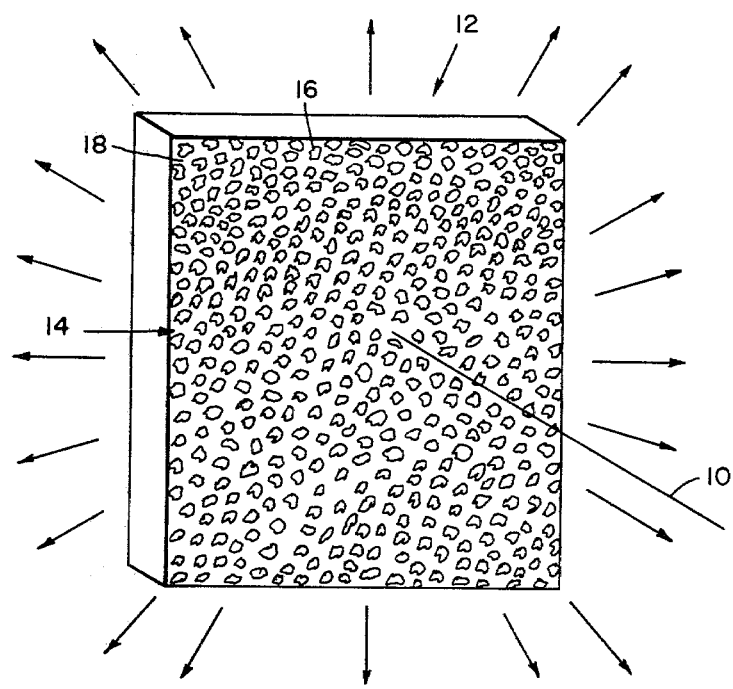

HIGH POWER LASER IRRADIANCE DISPLAY MATERIAL

DEDICATORY CLAUSE

The invention described herein may be manufactured, used, and licensed by or for the Government for governmental purposes without the payment to us of any royalties thereon.

BACKGROUND OF THE INVENTION

High power infrared lasers are capable of projecting a beam of invisible radiation over great distances, producing very large amounts of heat in any material substance which intersects the beam. A method for determining the position and irradiance distribution of the laser beam on a remotely-located target is required to assess the performance of the laser and for bore-sighting the beam transmitter. Because of the very high energy associated with the laser beam, active infrared detectors and sensors cannot be used.

Conventional passive, high power infrared laser irradiance display materials (such as zirconium dioxide or hafnium dioxide) perform the functions of laser spot location and display of their radiance distribution by simply absorbing the laser radiation, converting it to heat, and reradiating visible radiation, thus providing a pattern of visible radiation in known relationship to the infrared laser radiation. These materials must be refractory, to withstand the high temperatures, have a high absortivity for the laser radiation and have a high emissivity for visible radiation. They should also possess good mechanical strength, resistance to oxidation and be easy to fabricate into desired shapes. As the incident laser irradiance is increased, however, any material which has a high absorptivity for the laser radiation will eventually absorb enough energy to melt, sublime, vaporize, or otherwise degrade. For the conventional passive irradiance display materials, the maximum continuous-wave $CO_2$ laser irradiance is of the order of a few kilowatts per $cm^2$. This irradiance is much below that which can be produced by state-of-the-art high-power laser devices.

An object of this invention is to provide a method for laser spot location and irradiance display at irradiances much higher than current state-of-the-art techniques, using the principles of partial reflection of the laser radiation and heat-sinking of the absorbed energy.

A further object of this invention is to provide a material which can withstand very high laser irradiances without degradation, and perform the functions of passive infrared laser spot location and irradiance display.

SUMMARY OF THE INVENTION

A device for the passive location and irradiance display of high power infrared laser beams, at remote locations, utilizing the combination of a reflecting material with high thermal conductivity and an absorbing, refractory material with high emissivity in the visible portion of the electromagnetic spectrum. Mixtures of these two types of material are prepared by powder metallurgy, in a suitable geometric form such as plates or discs. The proportions of the two types of material may be varied, to change the proportions of reflected and absorbed laser energy. The surface of the material will consist of small particles of the refractory substance in a matrix of reflecting material.

BRIEF DESCRIPTION OF THE DRAWING

The single FIGURE of the drawing is a schematic view of the device employed in accordance with the principles of this invention for the display of high power laser irradiance.

DESCRIPTION OF THE PREFERRED EMBODIMENT

A device for the display of high power laser irradiance which utilizes the combination of a reflective material of high thermal conductivity and a refractory material of high visible emissivity to provide irradiance display at high laser irradiances.

In reference to the FIGURE, a high power infrared laser beam 10 impinges on a plate 12 of laser irradiance display material 14 producing a region of visible incandescence in which the intensity of visible light is related to the irradiance of the laser beam. Said irradiance display material 14 is composed of a conventional irradiance display material such as finely-divided zirconium dioxide powder 16 imbedded in and uniformly distributed throughout a matrix of high reflectivity, high thermal conductivity material, such as copper 18. The matrix reflects a portion of the incident laser radiation, said portion depending on the fraction of copper in the composite, thus reducing the thermal load on the material. In addition, the matrix rapidly and efficiently conducts heat away from the hot particles of irradiance display material, reducing thermal degradation of the particles.

The refractory particles radiate in the visible portion of the electromagnetic spectrum, in proportion to the incident laser intensity. The surrounding matrix of reflective material serves to conduct away heat from the particles of refractory material, thus preventing their thermal degradation. This heat sinking effect produces a decrease in sensitivity of the material; i.e., the change in visible light output with change in laser irradiance. However, this decrease of sensitivity is compensated by the greatly increased laser irradiance which may be accommodated.

The pattern of visible radiation may be viewed with a wide variety of optical devices. For quantitative data, the display material may be photographed with a high speed cine camera, and the resultant film analyzed densitometrically. Alternately, the data may be obtained with a TV camera and analyzed by conventional video analysis techniques.

We claim:

1. A device for the passive location of high power infrared laser beams at remote locations comprising;
   a. a plate;
   b. an absorbing refractory material and a reflecting material with high thermal conductivity disposed on said plate in a mixture whereby said refracting material radiater in the visible portion of the electromagnetic spectrum, in response to impingement by said laser beam, and the surrounding matrix of reflecting material conducts away heat from said refractory material.
2. A device as in claim 1 wherein said refractory material is finely divided zirconium dioxide powder.
3. A device as in claim 2 wherein said reflecting material is copper.
4. A device as in claim 3 wherein said mixture is in a matrix of plates.
5. A device as in claim 3 wherein said mixture is in a matrix of discs.
6. A device as in claim 1 wherein said refractory material is hafnium dioxide.

* * * * *